(12) United States Patent
Kallio et al.

(10) Patent No.: US 6,408,184 B1
(45) Date of Patent: Jun. 18, 2002

(54) APPARATUS, AND ASSOCIATED METHOD, FOR CELL SELECTION IN A PACKET RADIO COMMUNICATION SYSTEM

(75) Inventors: Janne Kallio, Ylojarvi; Peeter Pruuden, Tampere, both of (FI)

(73) Assignee: Nokia Corporation, Keilalahdentie (FI)

( * ) Notice: Subject to any disclaimer, the term of this patent is extended or adjusted under 35 U.S.C. 154(b) by 0 days.

(21) Appl. No.: 09/405,670

(22) Filed: Sep. 24, 1999

(51) Int. Cl.[7] ................................................ H04Q 7/20
(52) U.S. Cl. .................... 455/445; 455/560; 370/331
(58) Field of Search ................................ 455/560, 466, 455/445, 423, 424, 67.1, 554, 555, 436, 440, 439, 438, 62; 370/349, 389, 331, 332, 333

(56) References Cited

U.S. PATENT DOCUMENTS 5,583,913 A * 12/1996 Taketsugu .................... 455/560
5,867,791 A *  2/1999 Chambert .................... 455/525

FOREIGN PATENT DOCUMENTS

| EP | 0 848 560 A2 | 12/1997 |
| WO | WO 96/28947 | 9/1996 |
| WO | WO 99/48311 | 9/1999 |

OTHER PUBLICATIONS

PCT WO 99/48311.*

* cited by examiner

Primary Examiner—Edward F. Urban
Assistant Examiner—Sheila Smith

(57) ABSTRACT

Apparatus, and an associated method, for performing cell selection in a packet radio communication system, such as a WIO (wireless intranet office) system. Indications of the quality of communications through a packet data network to which a base transceiver station is coupled is provided to a mobile terminal. When the mobile terminal is positioned at a location in which the mobile terminal can camp-on a selected one of more than one base transceiver stations, determination of which of the more than one base transceiver stations to which the mobile terminal should camp-on is made responsive, at least in part, to values of the quality of the packet data network.

16 Claims, 2 Drawing Sheets

APPARATUS, AND ASSOCIATED METHOD, FOR CELL SELECTION IN A PACKET RADIO COMMUNICATION SYSTEM

The present invention relates generally to cell selection in a packet communication system having a radio part, such as a WIO (wireless intranet office). More particularly, the present invention relates to a manner by which to utilize packet network quality as an indicia of the cell selection. Improved communication quality is possible in such a system as cell selection takes into account quality indicia of a packet network in addition to, or alternate to, quality indicia of the radio part of the communication system.

BACKGROUND OF THE INVENTION

New types of communication systems have been made possible as a result of advancements in communication technologies. Such new types of communication systems have generally permitted increased rates of data transmission and corresponding amounts of data to be communicated in such new communication systems.

The advancements in communication technologies have, for example, permitted the introduction, and popularization, of new types of radio communication systems. Radio communication systems are advantageously utilized as communication paths formed during operation thereof include radio links. By utilization of radio links to form at least portions of the communication paths upon which information is communicated, the use of such portions of the communication paths do not require conventional wirelines. Increased communication mobility, relative to conventional wireline communication systems, is thereby generally possible in a radio communication system.

The communication capacity of a radio communication system, however, is sometimes limited by bandwidth limitations. That is to say, generally, only a limited spectrum allocation is provided to a radio communication system. Communication channels are defined within the allocated spectrum. And, communication signals are communicated upon the communication channels during operation of the radio communication system. However, because the spectrum allocation to the system is limited, the communication capacity of the communication system is sometimes limited by the amount of spectrum allocated to the system. Without additional spectrum allocation to the system, communication capacity of the system is possible only by utilizing more efficiently the allocated spectrum.

Digital communication techniques provide a manner by which to increase the bandwidth efficiency of communication in a communication system. The use of digital techniques is particularly advantageously utilized in a radio communication because of the limited spectrum typically allocated to such a system.

Information which is to be communicated in a communication system which utilizes digital communication techniques, typically, digitizes the information to form digital bits. The digital bits are typically formatted according to a formatting scheme. Groups of the digital bits, for instance, are positioned to form a packet, and, one or more packets of data together form a frame of data.

Because packets, or frames, of data can be communicated at discrete intervals, rather than continuously, a frequency band need not be dedicated solely for the communication of data between one communication pair. Instead, the frequency band can be shared amongst a plurality of different communication pairs. The ability to share the frequency band amongst more than one communication pair permits a multiple increase in the communication capacity of the system.

Packet data communications are effectuated, for instance, in conventional LANs (local area networks). Wireless networks, operable in manners analogous to wired LANs, referred to as WLANs (wireless local area networks) have also been developed and are utilized to communicate data over a radio-link. Packet communication systems, such as a LAN or WLAN, were generally initially installed to provide non-realtime data communications. But, with continued advancements in digital communication techniques, packet communication systems are increasingly installed to permit realtime communications. Telephony over IP (Internet protocol), e.g., voice communication by way of the Internet, or other packet data network backbone, is provided for in such systems.

A WIO (wireless intranet office) is exemplary of a packet radio communication system which is intended to provide voice, and other realtime, communications. Voice communications by way of a WIO provides the advantages of use of a wireless communication system in a cost-effective manner. Voice, as well as other data, can be communicated between mobile terminals operable in such a system. Various aspects of conventional cellular, or microcellular, communication systems are conventionally utilized in a WIO system.

For instance, in manners analogous to existing cellular communication systems, cell selection is made responsive to determination of radio link quality of the radio link extending between the mobile terminal and network infrastructure. Because other portions of a communication path conventionally extend to a fixed network, conventional systems do not generally consider the communication quality of the fixed network.

In contrast, in a WIO system, or other packet data network, different radio base stations might utilize different packet data networks, or portions thereof, through which to form a communication path. The different packet data networks might have differing levels of communication quality therethrough. Existing systems, however, do not take into account the packet network quality when determinations are made for purposes of cell selection. Cell selection might be made to have a mobile terminal, in either an idle or active mode, to be tuned-to, or "camp in" a cell which, while exhibiting good. radio link qualities, exhibit poor packet network qualities. Communication quality levels would suffer as a result.

If a manner could be provided by which to take into account packet network quality when making cell selection, improved communication quality levels of communications in such a system would result.

It is in light of this background information related to packet communication systems that the significant improvements of the present invention have evolved.

SUMMARY OF THE INVENTION

The present invention, accordingly, advantageously provides apparatus, and an associated method, by which to utilize an indicia of packet network quality during cell selection procedures in a packet radio communication system. In contrast to conventional packet radio communication systems which utilize only indicia of radio link quality levels, improved communication quality is possible through operation of an embodiment of the present invention. Communication quality levels in a packet data network to which a radio base station is coupled is taken into account during cell selection procedures.

In one aspect of the present invention, cell selection is made responsive to determination of the radio link quality and also responsive to the packet network quality to which a radio base station is coupled and through which a communication path would be formed pursuant to a communication session. If the radio link quality is of a level at least as great as a selected threshold, cell selection is made responsive to packet network quality levels of the cells available for selection. If, however, the radio link quality is less than the threshold level, the cell associated with the radio link exhibiting the poor radio link quality is not further considered in the cell selection process. Thereby, cell selection is made on the basis of the packet network quality as long as the radio link quality is at least as good at the threshold level.

In another aspect, an embodiment of the present invention is operable in a WIO (wireless intranet office) system. In the WIO system, a plurality of radio base stations are positioned throughout an area to permit wireless communications in the area encompassed by the plurality of radio base stations. Each radio base station defines a cell, and various of the cells, such as adjacent cells, include overlapping areas. When a mobile terminal is positioned at a location at which more than one cell overlaps, the mobile terminal is able to tune to, i.e., camp-on, a radio base station which defines either of the cells. Cell selection is performed to determine which of the radio base stations to which the mobile terminal camps.

An embodiment of the present invention provides a manner by which to select the cell to which the mobile terminal camps. The determination is made, for instance, to ensure better the best quality of communications with the mobile terminal. Indicia of the quality of the radio link extending between the mobile terminal and the radio base stations as well as indicia of the communication qualities in the portions of packet data networks to which the radio base stations are coupled are utilized in making the determination. To be selected, the radio link must exhibit a quality level at least as good as a minimum threshold level and the packet network communication quality level exhibits the best of the available selections. By performing cell selection according to an embodiment of the present invention, improved communication quality is possible. Also, because the communication quality of the packet network is taken into account, occurrences of hand over, required when packet network quality is below a minimum level, are decreased. And, system resources are better utilized.

In another aspect of the present invention, apparatus is provided for an IMC (intranet mobile cluster) which forms a portion of a WIO system. An IMC is associated with each radio base station of the WIO system. Apparatus of an embodiment of the present invention is coupled to receive values representative of radio link quality levels of a radio link formable between the radio base station associated therewith and a mobile terminal. And, the apparatus is coupled to receive values representative of packet network communication quality of a packet network to which the IMC is also coupled. Signals representative of such values are provided to a mobile terminal.

In another aspect of the present invention, apparatus is provided for a mobile terminal operable in a WIO system. The mobile terminal is operable to receive signals generated by various radio base stations indicating radio link quality and packet network quality values. Responsive to detection of such signals, determination is made at the mobile terminal to which of the radio base stations that the mobile terminal should "camp-on." The mobile terminal is further operable to generate signals indicative of such determination so that appropriate actions can be performed by the network infrastructure of the system.

In these and other aspects, therefore, apparatus, and an associated method, is provided for a mobile communication system having a mobile terminal positionable to be operable to communicate alternately by way of a first radio base station upon a first communication path with a correspondent entity and by way of at least a second radio base station upon at least a second communication path with the correspondent entity. The first communication path extends through a first packet data network, and the second communication path extends through a second packet data network. Determinations are made of a preferred communication path of the first and at least second communication paths upon which to communicate information. A detector is at least coupled to receive indications of a first packet-network indicia of communication quality through the first packet data network. The detector is at least further coupled to receive indications of a second packet-network indicia of communication quality through the second packet data network. The detector forms a first communication path quality value responsive, at least in part, to the first packet-network indicia of communication quality and a second communication path quality value responsive, at least in part, to the second indicia of communication quality. A determiner is coupled to receive the first communication path quality value and the second communication path quality value. The determiner determines the preferred communication path responsive thereto.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
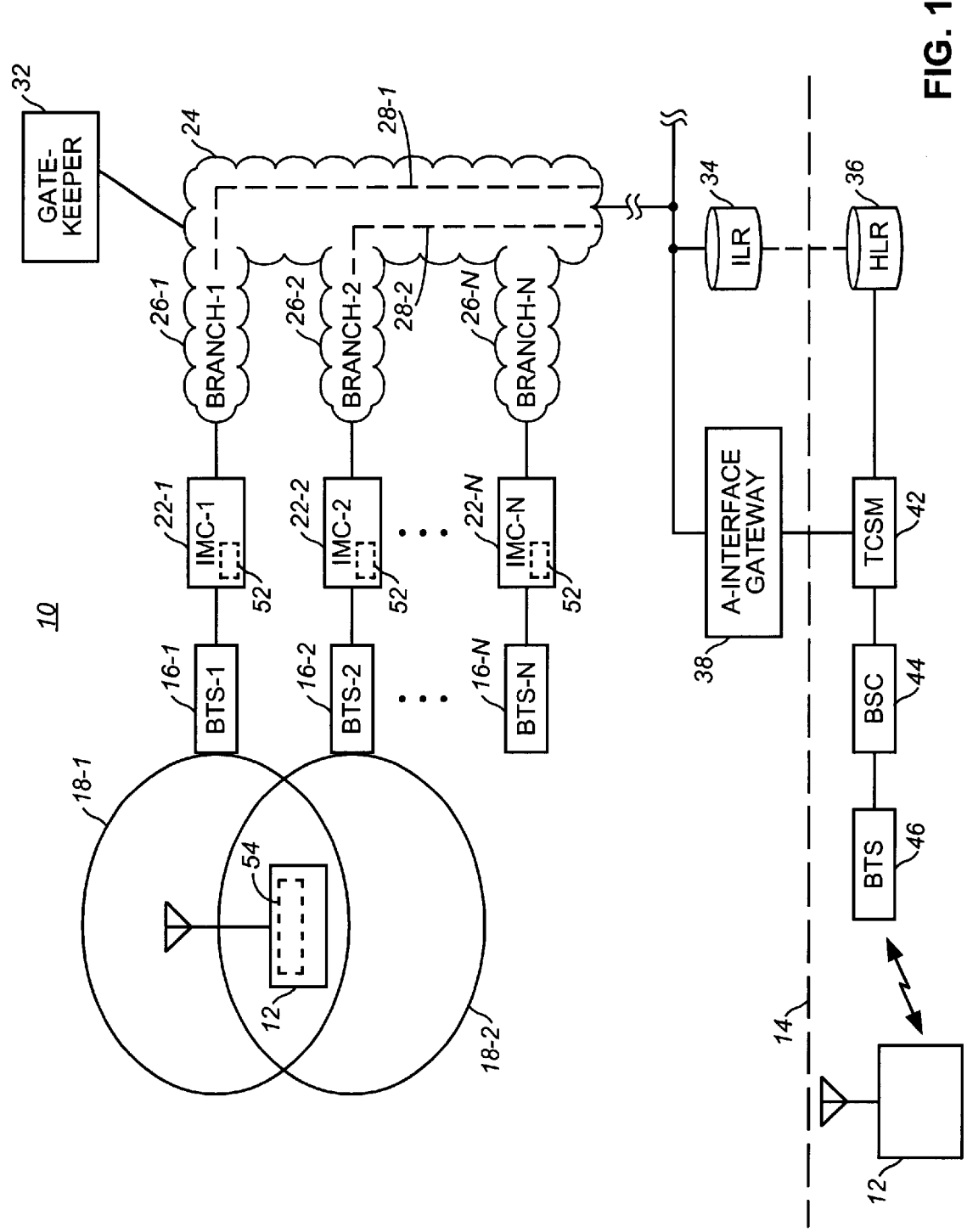
FIG. 1 illustrates a functional block diagram of a packet radio communication system in which an embodiment of the present invention is operable.

Turning first to FIG. 1, a packet radio communication system, shown generally at 10, is operable to provide radio communications with a mobile terminal 12 when the mobile terminal is positioned within an area encompassed by the system.

In the exemplary implementation, the system 10 is formed of a WIO (wireless intranet office) portion, formed of the elements positioned above the line 14, shown in dash, connected together with a GSM (global system for mobile communications) portion which is formed of the elements shown beneath the line 14 in the Figure. The illustrated system is exemplary. In other implementations, embodiments of the present invention are operable in other types of packet radio communication systems. And, operation of such embodiments of the present invention can analogously be described with respect to such systems.

The WIO portion of the system 10 includes a plurality of base transceiver stations (BTSs) 16. Here, N base transceiver stations are shown. Each of the base transceiver stations includes both radio receiver and radio transmitter circuitry capable of transceiving communication signals with a mobile terminal 12. And, each of the base transceiver stations defines a cell 18. The cells define coverage areas of the base transceiver stations with which the cells are associated. That is to say, when a mobile terminal is positioned within a cell associated with a particular base transceiver station, generally, communications are able to be effectuated between the mobile terminal and the base transceiver station.

As illustrated, the cells 18 include partially-overlapping areas. The overlapping nature of the cells reduces the possibility of communication termination as the mobile terminal is moved during a communication session. When the mobile terminal is positioned at a location at which two or more of the cells overlap, a possibility exists that the mobile terminal can communicate with a selected one of more than one base transceiver station. Also, when the mobile terminal is in an idle mode, i.e., when the mobile terminal is turned-on but is not being utilized in a communication session, the mobile terminal periodically registers its location and is set to "camp-on" a particular one of the base transceiver stations. When in the idle state, therefore, also, if the mobile terminal is positioned at a location having overlapping coverage areas, the mobile terminal is able to camp-on a selected one of more than one base transceiver station.

Each of the base transceiver stations 16 is coupled to an intranet mobile cluster (IMC) 22. The intranet mobile clusters perform various control functions, such as handling of radio resources and channel configurations, as well as detecting need for hand overs of communications between base transceiver stations and power control operations.

Each of the intranet mobile clusters 22 is coupled to a packet data network, here a local area network (LAN) 24. The local area network includes branches 26 which are representative of different portions of the local area network which are connected to respective ones of the intranet mobile clusters 22 and through which separate communication paths are formable during a communication session. The different communication paths exhibit different communication quality characteristics.

The WIO portion of the system 10 is further shown to include a gatekeeper (GK) 28. For instance, a first communication path 28-1 extends through the first branch 26 and a second communication path 28-2 extends through a second branch 26. Because the paths follow different routes, the communication quality characteristics of such different paths exhibit different communication quality levels.

The WIO portion of the system 10 is further shown to include a gatekeeper 32, also coupled to the local area network 24. The gatekeeper provides quality control services to a WIO end point. Functions such as call forwarding, call re-routing, and other advanced control features, such as mobility management are performed by the gatekeeper. And the WIO portion is further shown to include an intranet location register (ILR) 34 which is operable to form a database which stores permanent subscriber data. That is to say, the data stored at the intranet location register provides a storage base for retrieving mobile-terminal-specific information configured for the WIO portion of the communication system. The intranet location register 34 is coupled to corresponding structure, here shown to be a home location register (HLR) 36 of the GSM network portion of the communication system. An A-interface gateway (AGW) 38 also forms a portion of the communication system 10. The gateway 38 forms the gateway between the two portions of the communication system. And, here, the gateway is operable as a traffic router and data converter between the two portions.

The GSM network portion of the communication system 10 includes a transcoder sub-multiplexer (TCSM) 42 coupled to the gateway 38. Such device is operable to perform transcoding operations. The GSM network is further shown to include a base station controller 42 and a base transceiver station 46, operable in conventional manner, to transceive communication signals with a mobile terminal 12 operable in the GSM network.

Communication sessions are formable between mobile terminals or a mobile terminal and another type of correspondent entity. In one call scenario, communications are effectuated between two mobile terminals 12 positioned within the area encompassed by the WIO portion of the communication system, as well as communications between mobile terminals positioned at areas encompassed by the separate portions of the communication system. That is to say, communications are also effectuable between a mobile terminal 12 operable in the WIO portion and a mobile terminal operable in the GSM portion of the communication system.

The intranet mobile clusters 22 are here shown to further include a detector 52, and the mobile terminal 12 is further shown to include a determiner 54. The detector and determiner 52 and 54, respectively, are operable pursuant to an embodiment of the present invention to facilitate cell selection. Cell selection is performed, for instance, when the mobile terminal is in the idle mode and more than one base transceiver station is available to communicate with the mobile terminal. The detector 52 is operable to detect, or otherwise to form, values representative of both the radio-link extending between a particular base transceiver station and the mobile terminal and a communication path portion extending through the local area network or other packet data network, to which the detector, and associated intranet mobile cluster, is connected.

Signals representative of such values are provided to the base transceiver station and communicated to the mobile terminal. The mobile terminal receives such signals from more than one base transceiver station when the mobile terminal is positioned in an area encompassed by such base transceiver stations.

In the exemplary illustration, the mobile terminal receives signals from both the first base transceiver station (BTS-1) and from the second base transceiver station (BTS-2). The signals generated by the respective base stations include indications both of the radio-link qualities and also the packet data network quality levels of the communication paths formable therethrough. The determiner 54 of the mobile terminal is operable to determine, responsive to the signals received thereat, to which of the base transceiver stations, i.e., BTS-1 or BTS-2, to which the mobile terminal should camp-on.

A reverse link signal representative of the determination made by the determiner is returned to the infrastructure of the WIO portion of the communication system, and the mobile terminal is directed to camp-on the latest transceiver station responsive to the determination of the determiner.

In the exemplary implementation, the determiner determines the best base transceiver station through which a communication path is formable. In the exemplary implementation, the best base transceiver station is that which exhibits the best packet network quality as long as the radio-link quality is at least a minimum threshold level. If the radio-link quality is not at least a minimum threshold level, the determiner determines the best base transceiver station to camp-on to be the base transceiver station through which a communication path is formable which exhibits an adequate radio-link quality. In other implementations, of course, other manners by which to make determinations, at least partly responsive to packet network quality levels, are utilized. By utilizing indicia of the quality of communications through the packet data network during cell selection procedure provides better assurances of improved quality levels of communication during a communication session.

Figure 2:
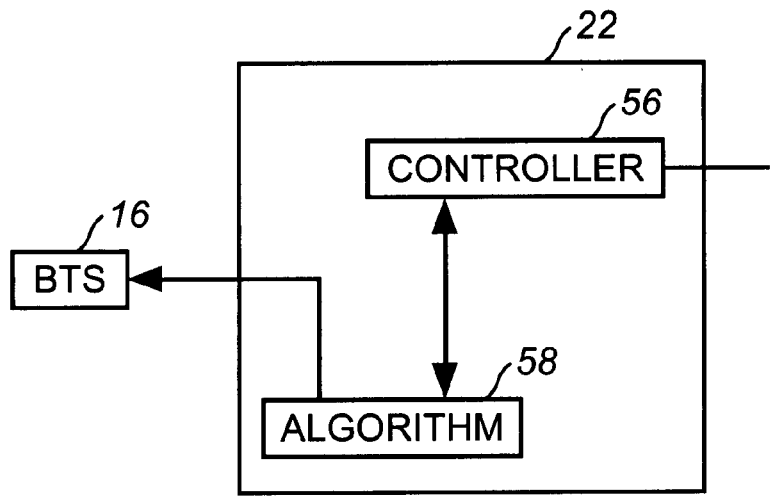
FIG. 2 illustrates a functional block diagram of a portion of the packet radio system shown in FIG. 1 according to an embodiment of the present invention.

FIG. 2 also illustrates a base transceiver station 16, an intranet mobile cluster 22, and a mobile terminal 12 operable pursuant to an embodiment of the present invention. In the exemplary implementation, the packet network is operable pursuant to an H.323 RTCP (real-time transport control protocol) protocol. In other implementations, the RTCP protocol is utilized in other environments. Or, in this exemplary implementation, the determiner 52 of the intranet mobile cluster maintains a quality reference number of values responsive to other RTCP reports of other ongoing communication sessions. In another implementation, the determiner 52 includes a mechanism for detecting packet loss, jitter, or packet network load. And, as shown in the exemplary implementation, the detector is formed of a controller 56 which executes an algorithm 58 for calculating the quality reference number. Once calculated, the number is provided to the base transceiver station from which the signal is transmitted upon a forward link to the mobile terminal 12. The packet network quality values may further be determined in other manners, such as by generating RTP test stream between the base transceiver station controller and another end in order to generate the RTCP reports for the particular communication path.

When received at the determiner 54 of the mobile terminal, comparisons are made between the values of the signals provided thereto, and a determination of the best available cell to camp-on is made.

Figure 3:
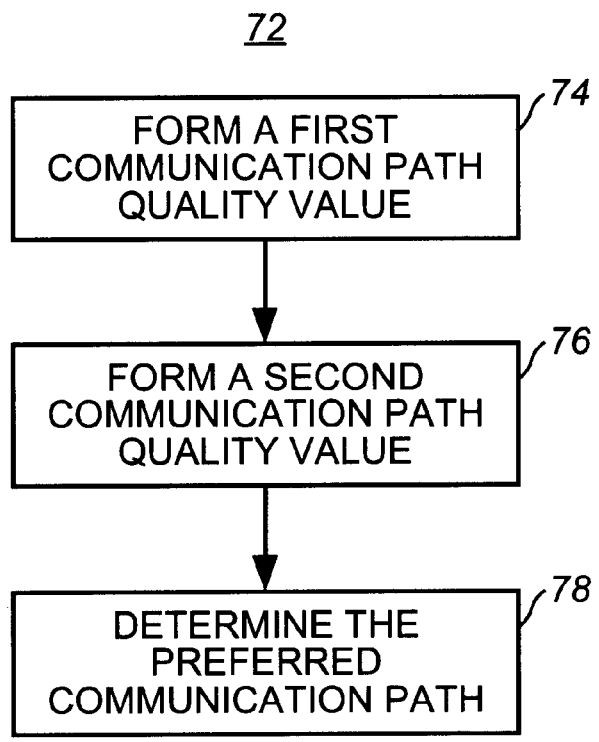
FIG. 3 illustrates a method flow diagram listing the method of operation of an embodiment of the present invention.

FIG. 3 illustrates a method, shown generally at 72, of an embodiment of the present invention. The method 72 is operable to determine the preferred communication path of a first and at least second communication paths of a packet radio communication system upon which to communicate information.

First, and as indicated by the block 74, a first communication path quality value is formed, responsive, at least in part, to a first packet-network indicia of communication quality through the first packet data network.

Then, and as indicated by the block 76, a second communication path quality value is formed responsive, at least in part, to a second packet-network indicia of communication quality through the second packet data network. And, as indicated by the block 78, the preferred communication path upon which to communicate information is determined.

Thereby, a manner is provided by which to better assure improved qualities of communications of a communication session by taking into account the quality levels of communications through a packet data network. Cell selection of a cell that exhibits both good radio criteria and good packet network quality criteria is more likely than through use of existing manners by which to perform cell selection.

The previous descriptions are of preferred examples for implementing the invention, and the scope of the invention should not necessarily be limited by this description. The scope of the present invention is defined by the following claims.

We claim:

1. In a mobile communication system having a mobile terminal positionable to be operable to communicate alternately by way of a first radio base station upon a first communication path with a correspondent entity and by way of at least a second radio base station upon at least a second communication path with the correspondent entity, the first communication path extending through a first packet data network and the second communication path extending through a second packet data network, an improvement of apparatus for determining a preferred communication path of the first and at least second communication paths, respectively, upon which to communicate information, said apparatus comprising:

a detector at least coupled to receive indications of a first packet-network indicia of communication quality through the first packet data network and a second packet-network indicia of communication quality through the second packet data network, and to receive indications of a first radio-link indicia of communication quality upon a first radio link formable between the mobile terminal and the first radio base station and to receive indications of a second radio-link indicia of communication quality upon a second radio link formable between the mobile terminal and the second radio base station, said detector for forming a first communication path quality value responsive to the first packet-network indicia and the first radio-link indicia and a second communication path quality value responsive to the second packet-network indicia and the second radio-link indicia, the first communication path quality level value beyond a first threshold level when the first radio-link indicia indicates the communication quality level upon the first radio link to be of at least a minimum acceptable level and the second communication path quality level value beyond a second threshold level when the second radio-link indicia indicates the communication quality upon the second radio link to be at least the minimum threshold level;

a determiner coupled to receive the first communication path quality value and the second communication path quality value, said determiner for determining the preferred communication path responsive thereto, the preferred communication path exhibiting a communication path quality level beyond the first threshold level.

2. The apparatus of claim 1 wherein the first radio base station and the second radio base station form portions of network infrastructure of the mobile communication system and wherein said detector is located at the network infrastructure.

3. The apparatus of claim 2 wherein said determiner is located at the network infrastructure.

4. The apparatus of claim 1 wherein said determiner is located at the mobile terminal.

5. The apparatus of claim 4 wherein said determiner further generates a preferred communication path indication indicative of the preferred communication path determined thereat, and wherein the mobile terminal generates a preferred communication path signal indicating the preferred communication path determined by said determiner.

6. The apparatus of claim 1 wherein the mobile terminal is at least selectably operable in an idle mode when powered-on and wherein determinations made by said determiner are made at selected intervals while the mobile terminal is maintained in the idle mode.

7. The apparatus of claim 1 wherein the mobile communication system comprises a WIO (wireless intranet office) system having a first IMC (intranet mobile cluster) coupled to the first radio base station and at least a second IMC (intranet mobile cluster) coupled to the at least the second radio base station and wherein said detector comprises a first detector portion located at the first IMC and a second detector portion located at the second IMC, the first detector portion coupled to receive the indications of the first packet-network indicia and for forming the first communication path quality value and the second detector portion coupled to receive the indications of the second packet-network indicia and for forming the second communication path quality value.

8. The apparatus of claim 7 wherein said determiner is located at the mobile terminal, wherein indications of the first communication path quality value are provided by the first detector portion to the mobile terminal by way of the first radio base station, and wherein indications of the second communication path quality value are provided by the second detector portion to the mobile terminal by way of the second radio base station.

9. The apparatus of claim 8 wherein a broadcast control channel upon which to broadcast control information from the network infrastructure is defined and wherein the indications of the first and second communication path quality values, respectively, are broadcast upon the broadcast control channel.

10. The apparatus of claim 1 wherein the mobile communication system is operable pursuant to a H.323 RTCP (real-time transport control protocol) protocol and is a multi-user communication system, wherein the first packet-network indicia is representative of communication quality of ongoing communications through the first packet data network, and wherein the second packet-network indicia is representative of communication quality of ongoing communications through the second packet data network.

11. The apparatus of claim 10 wherein the communication quality of the ongoing communications of which the first packet-network indicia is representative is measured in terms of packet loss and wherein the communication quality of the ongoing communications of which the second packet-network indicia is representative is measured in terms of packet loss.

12. The apparatus of claim 10 wherein the communication quality of the ongoing communications of which the first packet-network indicia is representative is measured in terms of first packet-network load and wherein the communication quality of the ongoing communications of which the second packet-network indicia is representative is measured in terms of second packet-network load.

13. In a method for communicating in a mobile communication system having a mobile terminal positionable to be operable to communicate alternately by way of a first radio base station upon a first communication path with a correspondent entity and by way of at least a second radio base station upon at least a second communication path with the correspondent entity, the first communication path extending through a first packet data network and the second communication path extending through a second packet data network, an improvement of a method for determining a preferred communication path of the first and at least second communication paths, respectively, upon which to communicate information, said method comprising:

forming a first communication path quality value responsive to a first packet-network indicia of communication quality through the first packet data network and to a first radio-link indicia of communication quality upon a first radio link formable between the mobile terminal and the first radio base station, the first communication path quality level value beyond a first threshold level when the first radio-link indicia indicates the communication quality level upon the first radio link to be of at least a minimum acceptable level;

forming a second communication path quality value responsive to a second packet-network indicia of communication quality through the second packet data network and to a second radio-link indicia of communication quality upon a second radio-link formable between the mobile terminal and the second radio base station, the second communication path quality level value beyond a second threshold level when the second radio-link indicia indicates the communication quality upon the second radio-link to be at least the minimum threshold level; and determining, responsive to the first communication path quality value and the second communication path quality value, the preferred communication path upon which to communication information, the preferred communication path exhibiting a communication path quality level beyond the first threshold level.

14. The method of claim 13 wherein the first radio base station and the second radio base station form portions of network infrastructure and wherein said operations of forming are performed at the network infrastructure.

15. The method of claim 13 wherein said operation of determining is performed at the mobile terminal.

16. In a wireless intranet office having a mobile terminal positionable to be operable to communicate alternately, by way of a first radio base station to which a first intranet mobile cluster is coupled, upon a first communication path with a correspondent entity and, by way of at least a second radio base station to which a second intranet mobile cluster is coupled upon at least a second communication path with the correspondent entity, the first communication path extending through a first packet data network and the second communication path extending through a second packet data network, an improvement of apparatus for determining a preferred communication path of the first and at least second communication paths, respectively, upon which to communicate information, said apparatus comprising:

a detector having at least a first detector portion and a second detector portion, the first detector portion located at the first intranet mobile cluster and coupled to receive indications of a first packet-network indicia of communication quality through the first packet data network and for forming a first communication path quality value responsive at least in part, to the first packet-network indicia of communication quality, and the second detector portion located at the second intranet mobile cluster and coupled to receive indicators of a second packet-network indicia of communication quality through the second packet data network and for forming a second communication path quality value responsive, at least in part, to the second indicia of communication quality; and a determiner coupled to receive the first communication path quality value and the second communication path quality value, said determiner for determining the preferred communication path responsive thereto.

* * * * *